(12) United States Patent
Guo

(10) Patent No.: US 11,356,655 B2
(45) Date of Patent: Jun. 7, 2022

(54) TESTING DEVICE TO TEST CAMERAS OF VARIOUS TYPES AND SIZES WITH THE ABILITY TO ALLOW CHANGES TO TEST PARAMETERS

(71) Applicant: TRIPLE WIN TECHNOLOGY(SHENZHEN) CO. LTD., Shenzhen (CN)

(72) Inventor: Cheng-Gang Guo, Shenzhen (CN)

(73) Assignee: TRIPLE WIN TECHNOLOGY(SHENZHEN) CO. LTD., Shenzhen (CN)

(*) Notice: Subject to any disclaimer, the term of this patent is extended or adjusted under 35 U.S.C. 154(b) by 419 days.

(21) Appl. No.: 16/718,277

(22) Filed: Dec. 18, 2019

(65) Prior Publication Data

US 2021/0067767 A1  Mar. 4, 2021

(30) Foreign Application Priority Data

Aug. 30, 2019  (CN) .......................... 201921439129.7

(51) Int. Cl.
  *G01D 11/24*  (2006.01)
  *H04N 17/00*  (2006.01)

(52) U.S. Cl.
  CPC .......... *H04N 17/002* (2013.01); *G01D 11/24* (2013.01)

(58) Field of Classification Search
  CPC ........................ G01D 11/24; H04N 17/002
  See application file for complete search history.

(56) References Cited

U.S. PATENT DOCUMENTS 10,203,595 B2 * 2/2019 Li .......................... G03B 13/36

FOREIGN PATENT DOCUMENTS

CN          215682481 U  *  1/2022

* cited by examiner

*Primary Examiner* — Jamel E Williams
(74) *Attorney, Agent, or Firm* — ScienBiziP, P.C.

(57) ABSTRACT

A device for testing cameras which is adaptable for testing optical devices of different sizes and types includes a holder, a top plate, and an illumination assembly. The holder includes a frame. The top plate is disposed on the frame. The illumination assembly includes a lamp holder and an illumination module. The lamp holder is slidably disposed on a surface of the top plate facing away from the frame in a first direction. The illumination module, wherein the illumination module is slidably disposed on the lamp holder facing away from the frame in a second direction.

10 Claims, 5 Drawing Sheets

TESTING DEVICE TO TEST CAMERAS OF VARIOUS TYPES AND SIZES WITH THE ABILITY TO ALLOW CHANGES TO TEST PARAMETERS

FIELD

The subject matter herein generally relates to a testing device to test cameras of different types and sizes, the testing device is adjustable to allow changes to test parameters.

BACKGROUND

During the manufacture of cameras, testing devices are used to test the cameras. In general, a testing device can test the cameras of a single type or a single size. Further, the testing device cannot change the test parameters according to different test requirements.

BRIEF DESCRIPTION OF THE DRAWINGS

Implementations of the present disclosure will now be described, by way of embodiments, with reference to the attached figures.

DETAILED DESCRIPTION

Figure 1:
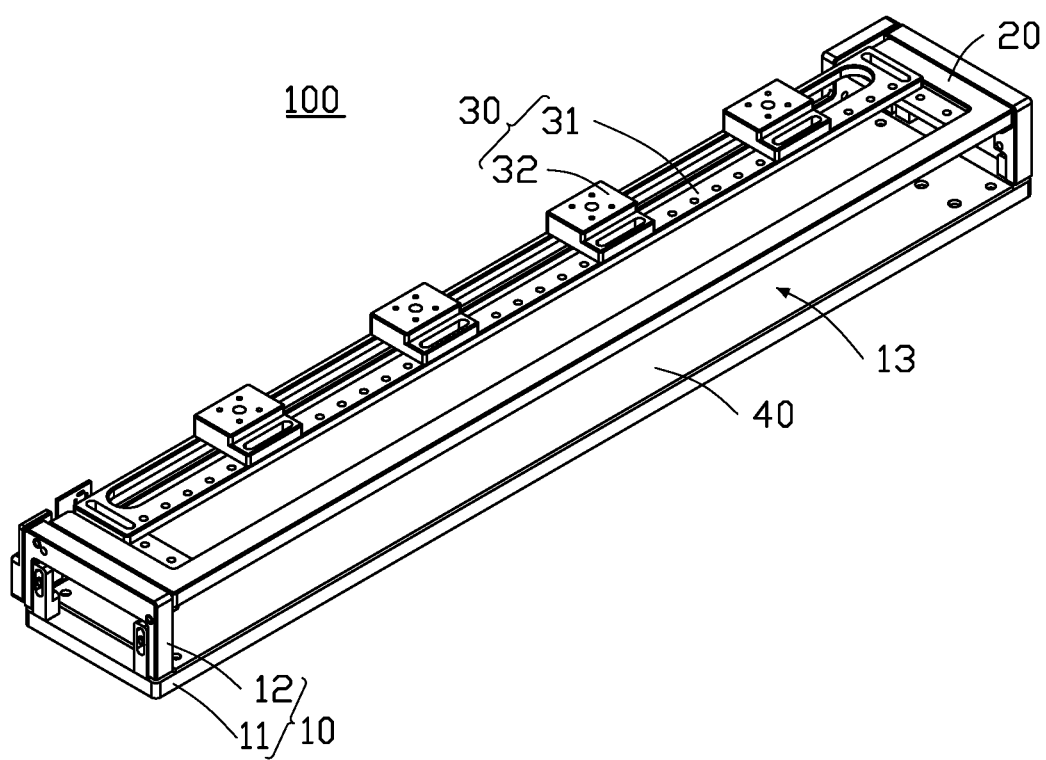
FIG. 1 is a view of an embodiment of a testing device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiment described herein can be practiced without these specific details. In other instances, methods, procedures, and components have not been described in detail so as not to obscure the related relevant feature being described. Further, the description is not to be considered as limiting the scope of the embodiments described herein. The drawings are not necessarily to scale and the proportions of certain parts may be exaggerated to better illustrate details and features of the present disclosure.

The term "comprising" when utilized, means "includes, but is not limited to"; it specifically indicates open-ended inclusion or membership in the so-described combination, group, series and the like. The term "coupled" when utilized, means "either a direct electrical connection between the things that are connected, or an indirect connection through one or more passive or active intermediary devices, but is not limited thereto".

Figure 2:
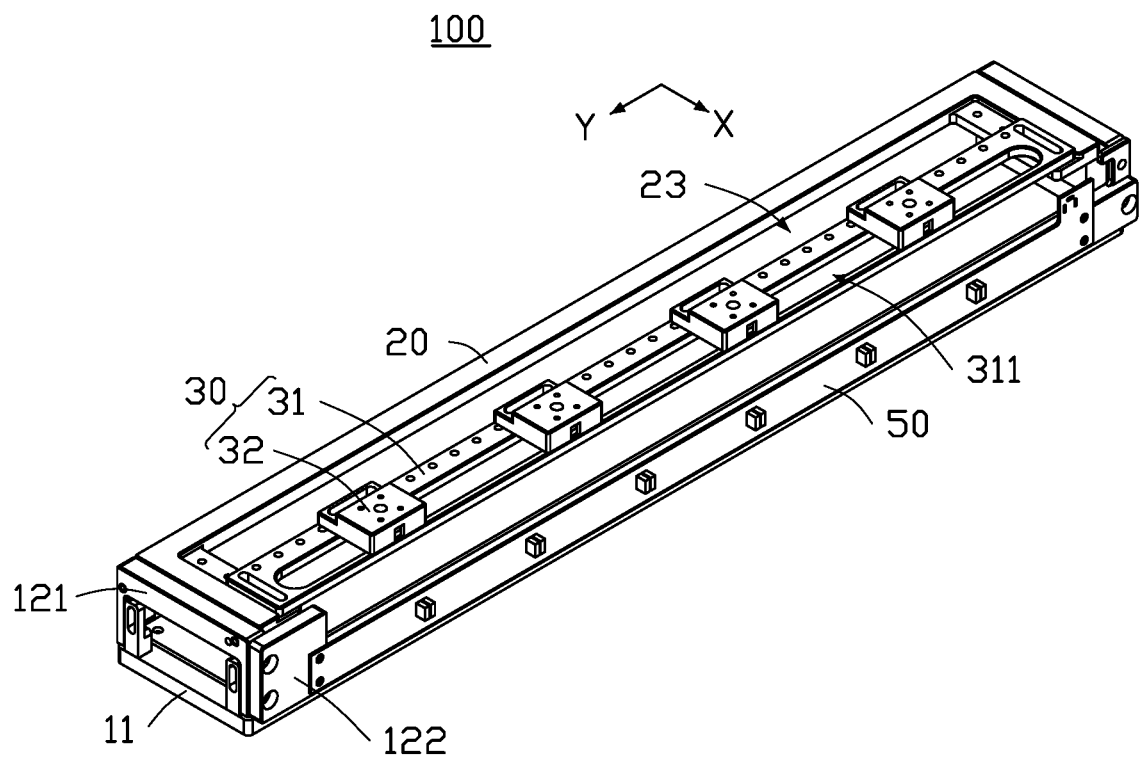
FIG. 2 is a view of the testing device in FIG. 1 from another perspective.

FIGS. 1 and 2, illustrates an embodiment of a testing device 100, which can be used to test a test component (not shown). The test may be a reliability test. In at least one embodiment, the test component may be a camera, which may be for a mobile phone, a tablet, a vehicle system, or a wearable device.

The testing device 100 includes a holder 10, a top plate 20, and an illumination assembly 30.

The holder 10 includes a bottom plate 11 and a support frame 12.

The testing device 100 further includes a test board 40. The test board 40 is disposed on the bottom plate 11 for structural stability. In one embodiment, the test board 40 may be fixed to the bottom plate 11 by screws (not shown). In other embodiments, the bottom plate 11 can be omitted.

The test board 40 can simulate the working state of the test component to improve the feasibility of the reliability test and the accuracy of the test result. In one embodiment, the test board 40 can include a power input circuit, an MCU (Microcontroller Unit) control circuit, an LDO (Low Dropout Regulator) circuit, a filter circuit, voltage regulator circuit, square wave signal circuit, pulse signal circuit, connector port, and test point. The test board 40 may be changed according to the type of the test component.

Figure 4:
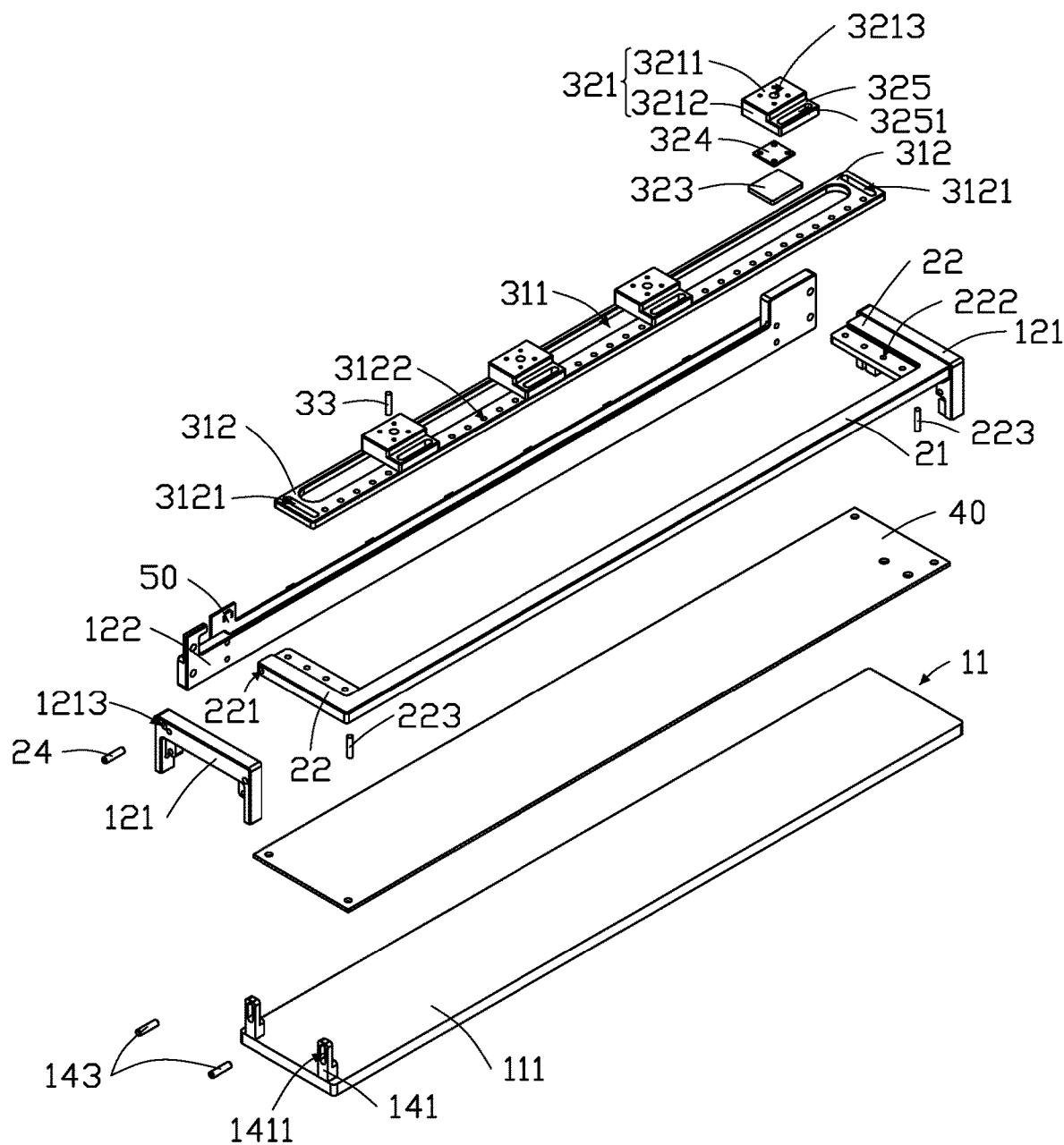
FIG. 4 is an exploded view of the testing device in FIG. 1.
Figure 5:
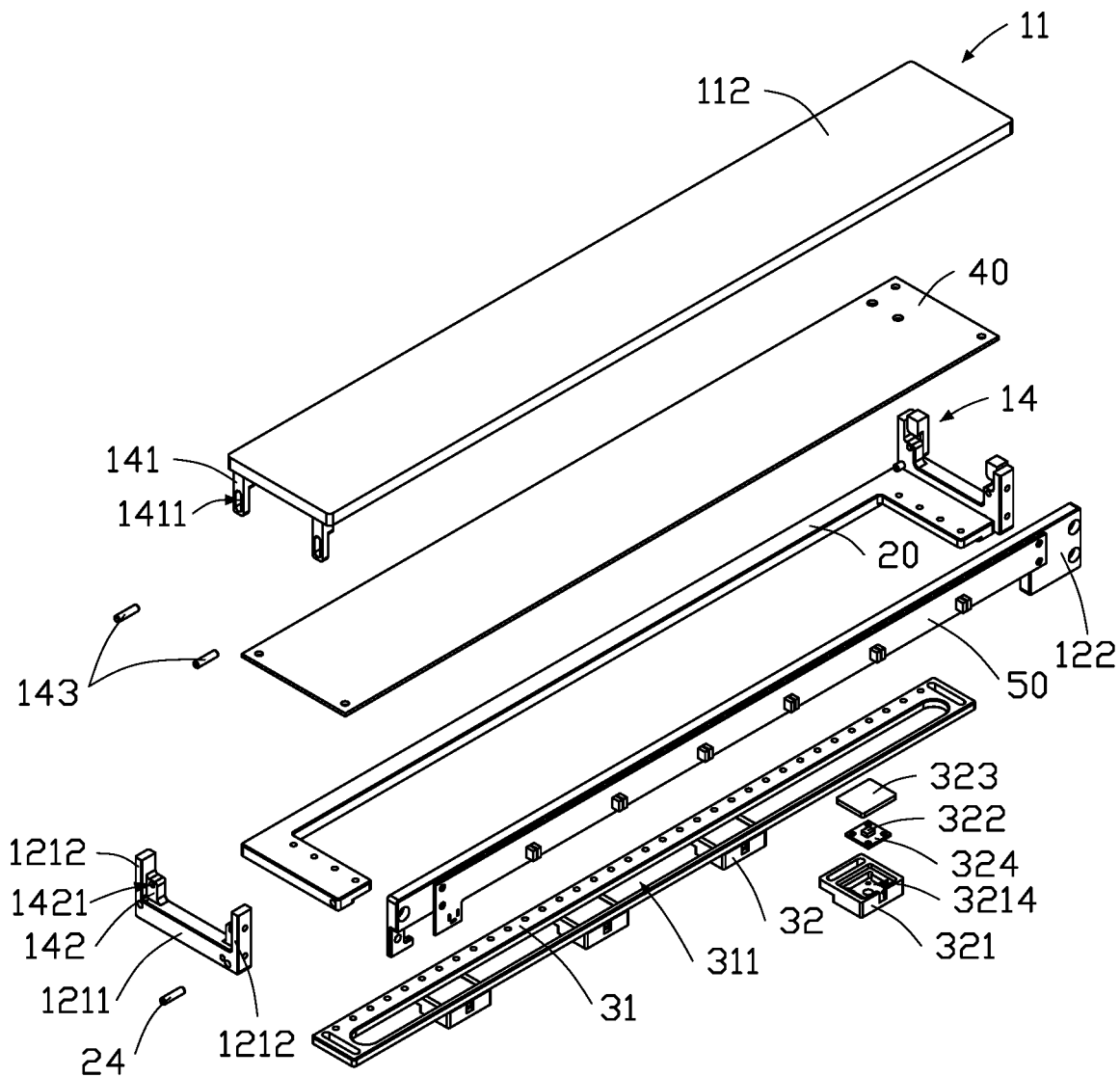
FIG. 5 is an exploded view of the testing device in FIG. 1 from another perspective.

Referring to FIGS. 4 and 5, the bottom plate 11 includes a first surface 111 and a second surface 112 opposite the first surface 111. In at least one embodiment, the bottom plate 11 is rectangular. In other embodiments, the shape of the bottom plate 11 may be oval or triangular.

Figure 3:
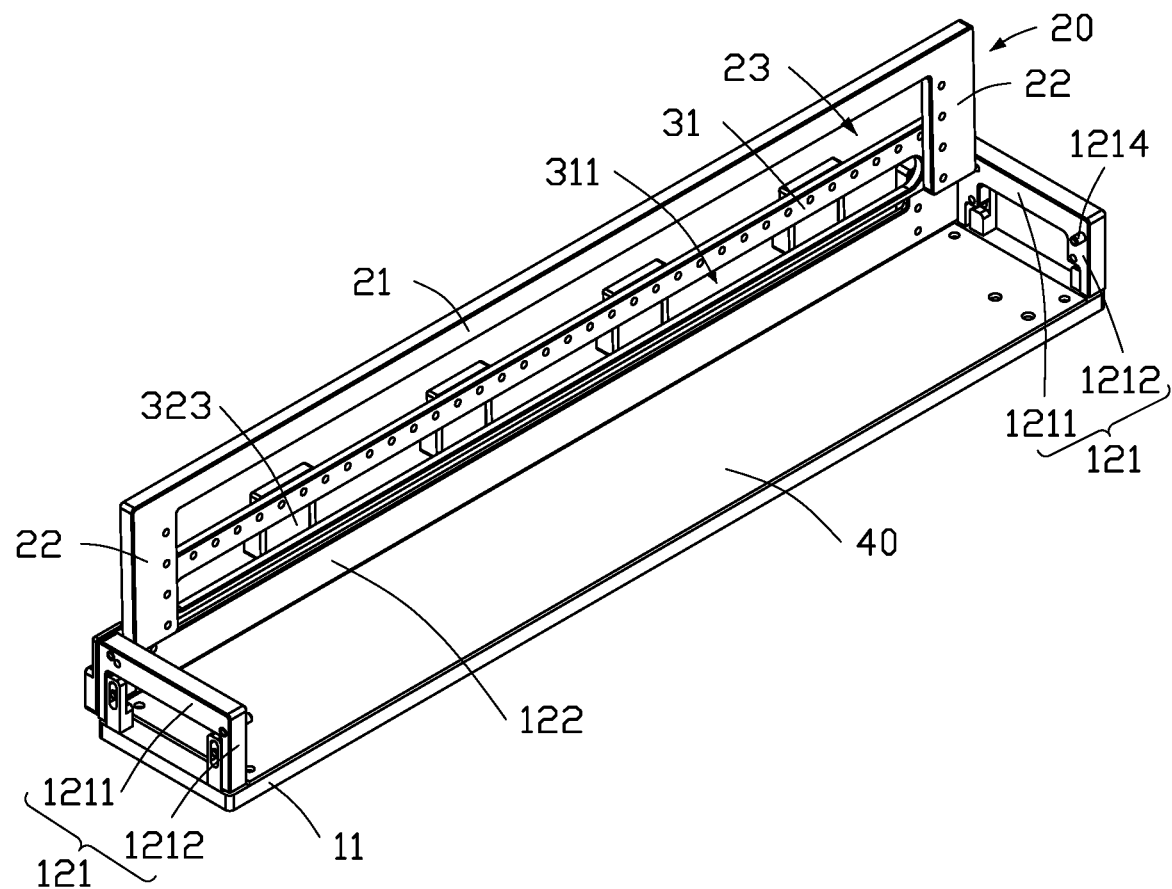
FIG. 3 is a view of the testing device in FIG. 1 in use.

Referring to FIGS. 1, 3, and 4, the frame 12 is disposed on the bottom plate 11. In at least one embodiment, the frame 12 includes two first side plates 121 and a second side plate 122. The two first side plates 121 face each other. The second side plate 122 is connected between the two first side plates 121. The two first side plates 121 and the second side plate 122 are disposed on the first surface 111. The second side plate 122, the two first side plates 121, and the bottom plate 11 cooperatively define a receiving space 13. The receiving space 13 receives the test component.

In at least one embodiment, the first side plate 121 includes a first side plate body 1211 and two protrusions 1212. The two protrusions 1212 face each other. The two protrusions 1212 are disposed on two sides of the first side plate body 1211 and are located between the first side plate body 1211 and the bottom plate 11.

Referring to FIG. 5, the holder 10 further includes a connecting block 14. The connecting block 14 is disposed between the bottom plate 11 and the frame 12.

The connecting block 14 includes a first connecting portion 141, a second connecting portion 142, and a connecting post 143. The first connecting portion 141 defines a first through hole 1411. The first through hole 1411 is oval. The second connecting portion 142 is disposed between the first side plate body 1211 and the protrusions 1212. The second connecting portion 142 defines a second through hole 1421 connected to the first through hole 1411. The connecting post 143 is disposed in the second through hole 1421. In at least one embodiment, an end of the first connecting portion 141 away from the first through hole 1411 is fixedly disposed on the bottom plate 11, and the connecting post 143 is disposed in first through hole 1411. Further, the connecting post 143 can slide in the first through hole 1411 when the frame 12 is moved relative to the bottom plate 11. Therefore, a size of the receiving space 13 can be adjusted for receiving test components of different sizes.

In other embodiments, the connecting block 14 can be omitted. Then, the frame 12 is fixedly disposed on the bottom plate 11.

Referring to FIGS. 3 and 4, the top plate 20 is rotatably connected to the frame 12. Thus, it is convenient for the user to take out and put in the test component. In at least one embodiment, the top plate 20 is disposed on a side of the first side plate 121 away from the bottom plate 11 and between the two first side plates 121.

The top plate 20 includes a top plate body 21 and two connecting plates 22. The two connecting plates 22 face each other and are respectively disposed on two sides of the top plate body 21. The two connecting plates 22 are located between the top plate body 21 and the second side plate 122, and two connecting plates 22, top plate body 21 and the second side plate 122 cooperatively define an opening 23. The opening 23 is connected to the receiving space 13. Each connecting plate 22 defines a first mounting hole 221 away from the top plate body 21. The first mounting hole 221 faces the first side plate 121. The first side plate 121 defines a second mounting hole 1213 connected to the first mounting hole 221. In at least one embodiment, the top plate 20 includes a mounting member 24. The mounting member 24 passes through the first mounting hole 221 and the second mounting hole 1213 to rotate the top plate 20 to the frame 12. The top plate body 21 and the two connecting plates 22 are integrally formed.

Referring to FIG. 3 and FIG. 4, the frame 12 further includes a limiting post 1214. The limiting post 1214 is disposed on an end of the first side panel bodies 1211 away from the second mounting hole 1213, to limit an angle of the top plate 20 being rotated toward the bottom plate 11. The limiting post 1214 faces the bottom plate 11.

Referring to FIGS. 1 and 2, the illumination assembly 30 includes a lamp holder 31 and a plurality of illumination modules 32.

The lamp holder 31 is slidably disposed on the top plate 20 in a first direction. The first direction is defined as the X direction. In at least one embodiment, the lamp holder 31 defines a through hole 311. The through hole 311 penetrates the lamp holder 31 and is connected to the opening 23.

In one embodiment, the lamp holder 31 further includes a slide rail (not shown). The slide rail is disposed on one lamp holder 31 and the top plate 20, such that the lamp holder 31 can slide relative to the top plate 20 in the first direction.

Referring to FIG. 4, in at least one embodiment, the lamp holder 31 includes two end portions 312 opposite each other. The two end portions 312 of the lamp holder 31 are respectively disposed on the two connecting plates 22 of the top plate 20. Each end portion 312 defines a first sliding hole 3121. The connecting plate 22 defines a first matching hole 222 matching the first sliding hole 3121. The connecting plate 22 further includes a first limiting block 223. The first limiting block 223 is disposed in the first matching hole 222. The first limiting block 223 is further disposed in the first sliding hole 3121. Further, the first limiting block 223 can slide in the first sliding hole 3121 to drive the lamp holder 31 to move relative to the top plate 20 in the first direction.

In at least one embodiment, the connecting plate 22 defines a plurality of first matching holes 222. The first limiting block 223 is disposed only in one of the first matching holes 222. Thus, a sliding range of the lamp holder 31 relative to the top plate 20 can be adjusted by adjusting a position of the first limiting block 223. In one embodiment, the first matching holes 222 are spaced apart from each other by a same distance.

Referring to FIGS. 2, 4 and 5, the illumination module 32 is slidably disposed on the lamp holder 31 in a second direction. The second direction is defined as the Y direction. The first direction and the second direction are perpendicular to each other. In at least one embodiment, each illumination module 32 includes a housing 321, a lamp 322, and a light diffusion plate 323.

The housing 321 includes a top wall 3211 and a peripheral wall 3212. The peripheral wall 3212 is disposed at a periphery of the top wall 3211. In at least one embodiment, the top wall 3211 defines a plurality of through holes 3213.

The light diffusion plate 323 is disposed on a side of the peripheral wall 3212 away from the top wall 3211. The light diffusion plate 323, the peripheral wall 3212, and the top wall 3211 together form a receiving groove 3214.

Referring to FIGS. 3 and 4, the lamp 322 is received in the receiving groove 3214. The brightness of the lamp 322, the wavelength of light of the lamp 322, the number of lamps 322, and the type of the lamp 322 can be adjusted as necessary. In at least one embodiment, the illumination module 32 is disposed on a surface of the lamp holder 31 facing away from the bottom plate 11, and the light diffusion plate 323 is exposed to the through hole 311 of the lamp holder 31, so that the light of the lamp 322 can pass through homogenizing plate 323 to the receiving space 13.

Referring to FIG. 5, the illumination module 32 further includes a mounting plate 324. The lamp 322 is disposed on the mounting plate 324.

In one embodiment, the slide rail (not shown) is disposed on one lamp holder 31 and the illumination module 32 such that the illumination module 32 can slide relative to the lamp holder 31 in the second direction.

In at least one embodiment, the illumination module 32 further includes a connecting block 325. The connecting block 325 is disposed on the outer surface of the peripheral wall 3212. The illumination module 32 can be connected to the lamp holder 31 through the connecting block 325. The connecting block 325 defines a second sliding hole 3251. The lamp holder 31 defines a plurality of second matching holes 3122 connected to the second sliding holes 3251. The illumination assembly 30 further includes a second limiting block 33. The second limiting block 33 is disposed in one of the second matching holes 3122. The second limiting block 33 is disposed in the second sliding hole 3251. Further, the second limiting block 33 can slide in the second sliding hole 3251 to drive the illumination module 32 to move relative to the lamp holder 31 in the second direction.

The testing device 100 further includes a control panel 50. The control panel 50 is disposed on a surface of the second side plate 122 facing away from the first side plate 121. The control panel 50 is electrically connected to the lamp 322 through the through hole 3213 in the housing 321 and drives the lamp 322 to operate. In at least one embodiment, the control panel 50 includes a power input circuit, a power output circuit, an LDO (Low Dropout Regulator) circuit, a filter protection circuit, and the like. In at least one embodiment, the type and quantity of elements on the control panel 50 may be changed according to the number and type of the lamps 322. For example, the number of LDC circuits and/or the type of LDO chip may be changed.

With the above configuration, the lamp holder 31 is slidably disposed on the top plate 20 in the first direction, and the illumination module 32 is slidably disposed in the lamp holder 31 in the second direction. As such, the testing device 100 can adjust the position of the lamp 322 by moving the lamp holder 31 or/and the illumination module 32 according to the position of the test component (not shown). In addition, the illumination module 32 is detachably disposed on the lamp holder 31. Therefore, the user can also change the quantity, brightness, wavelength, or type of the lamp 322 according to the type of the test component, so as to save production cost and testing cost.

It is to be understood, however, that even through numerous characteristics and advantages of the present disclosure have been set forth in the foregoing description, together with details of assembly and function, the disclosure is illustrative only, and changes may be made in details, especially in the matters of shape, size, and arrangement of parts within the principles of the disclosure to the full extent indicated by the broad general meaning of the terms in which the appended claims are expressed.

What is claimed is:

1. A testing device, comprising:
a holder comprising a frame;
a top plate disposed on the frame; and
an illumination assembly comprising:
   a lamp holder, wherein the lamp holder is slidably disposed on a surface of the top plate facing away from the frame in a first direction; and
   an illumination module, wherein the illumination module is slidably disposed on the lamp holder facing away from the frame in a second direction.

2. The testing device of claim 1, wherein the holder further comprises a bottom plate, the bottom plate is disposed on a side of the frame away from the top plate, the frame is located between the bottom plate and the top plate.

3. The testing device of claim 2, wherein the testing device further comprises a test board, the test board is disposed on the bottom plate facing the top plate.

4. The testing device of claim 2, wherein the holder further comprises a connecting block, the connecting block is disposed between the frame and the bottom plate.

5. The testing device of claim 2, wherein the frame comprises two first side plates and a second side plate, the two first side plates face each other and are disposed on the bottom plate; the second side plate is connected between the two first side plates and between the bottom plate and the top plate; the second side plate, two first side plates, and the bottom plate cooperatively define a receiving space.

6. The testing device of claim 5, wherein the testing device further comprises a control panel disposing on the second side plate facing away from the first side plate, the control panel is electrically connected to the illumination module.

7. The testing device of claim 5, wherein the top plate comprises a top plate body and two connecting plates, the two connecting plates face each other, and are respectively disposed on two sides of the top plate body; the two connecting plates are located between the top plate body and the second side plate, the two connecting plates, the top plate body and the second side plate cooperatively define an opening, the opening is connected to the receiving space, the two connecting plates are rotatably connected to the two first side plate.

8. The testing device of claim 7, wherein the lamp holder defines a through hole, the through hole penetrates the lamp holder and is connected to the opening.

9. The testing device of claim 7, wherein the frame further comprises a limiting post, the limiting post is disposed on the second side plate and faces the bottom plate.

10. The testing device of claim 1, wherein illumination module comprises a housing, a lamp, and a light diffusion plate, the light diffusion plate is disposed on the housing, the light diffusion plate and the housing cooperatively form a receiving groove, the lamp is received in the receiving groove.

\* \* \* \* \*